(12) United States Patent
Wang

(10) Patent No.: US 6,605,685 B2
(45) Date of Patent: Aug. 12, 2003

(54) LOW SMOKE PRODUCING RESIN FOR USE IN HONEYCOMB SANDWICH PANELS

(75) Inventor: Yen-Seine Wang, Santa Monica, CA (US)

(73) Assignee: Hexcel Corporation, Dublin, CA (US)

( * ) Notice: Subject to any disclaimer, the term of this patent is extended or adjusted under 35 U.S.C. 154(b) by 94 days.

(21) Appl. No.: 09/930,071

(22) Filed: Aug. 14, 2001

(65) Prior Publication Data

US 2003/0040598 A1 Feb. 27, 2003

(51) Int. Cl.$^7$ .................. C08G 8/10; C08G 14/04; C08F 283/00
(52) U.S. Cl. ............. 528/129; 528/143; 528/154; 528/171; 528/230; 528/242; 528/266; 528/391; 525/480; 525/483
(58) Field of Search .................. 528/129, 443, 528/154, 171, 230, 242, 266, 391; 525/480, 483

(56) References Cited

U.S. PATENT DOCUMENTS

| | | |
|---|---|---|
| 3,256,361 A | 6/1966 | Harding et al. |
| 3,377,317 A | 4/1968 | Hoxie |
| 4,037,751 A | 7/1977 | Miller et al. .................. 220/9 |
| 4,288,491 A | 9/1981 | Surzhenko et al. .......... 428/332 |
| 4,299,872 A | 11/1981 | Miguel et al. ............... 428/117 |
| 4,557,961 A | 12/1985 | Gorges ....................... 428/117 |
| 4,598,007 A | 7/1986 | Kourtides et al. ........... 428/116 |
| 5,309,690 A | 5/1994 | Symons ....................... 52/309.9 |
| 5,798,307 A | 8/1998 | Davidovits et al. ......... 501/95.2 |
| 5,977,253 A | 11/1999 | Warakomski ................ 525/58 |
| 6,153,687 A | 11/2000 | Wang et al. ................. 524/538 |

FOREIGN PATENT DOCUMENTS

| | | | |
|---|---|---|---|
| EP | 0 380 728 | 8/1990 | |
| EP | 0 624 462 A1 | 11/1994 | .......... B32B/19/06 |
| WO | WO 91/11323 | 8/1991 | |

Primary Examiner—Duc Truong
(74) Attorney, Agent, or Firm—Shapiro & Dupont LLP

(57) ABSTRACT

An improved resin for use in making honeycomb sandwich panels. The improvement involves modifying a phenolic resin so that the amount of smoke and heat generated during combustion is reduced. The reduction in smoke and heat generation is achieved by reducing the amount of phenol used to form the phenolic resin. The phenol is replaced by low-smoke producing sulfone compounds such as 4,4'-bisphenol-S, 3,3'-bisphenol-S, biphenol and bisphenol ethers which reduce the number of smoke producing methylene or methylene ether linkages present in the cured phenolic resin. The low-smoke producing resin may be used as a dip resin for coating the honeycomb or as the matrix resin for the core and face sheets of the sandwich panel.

17 Claims, 2 Drawing Sheets

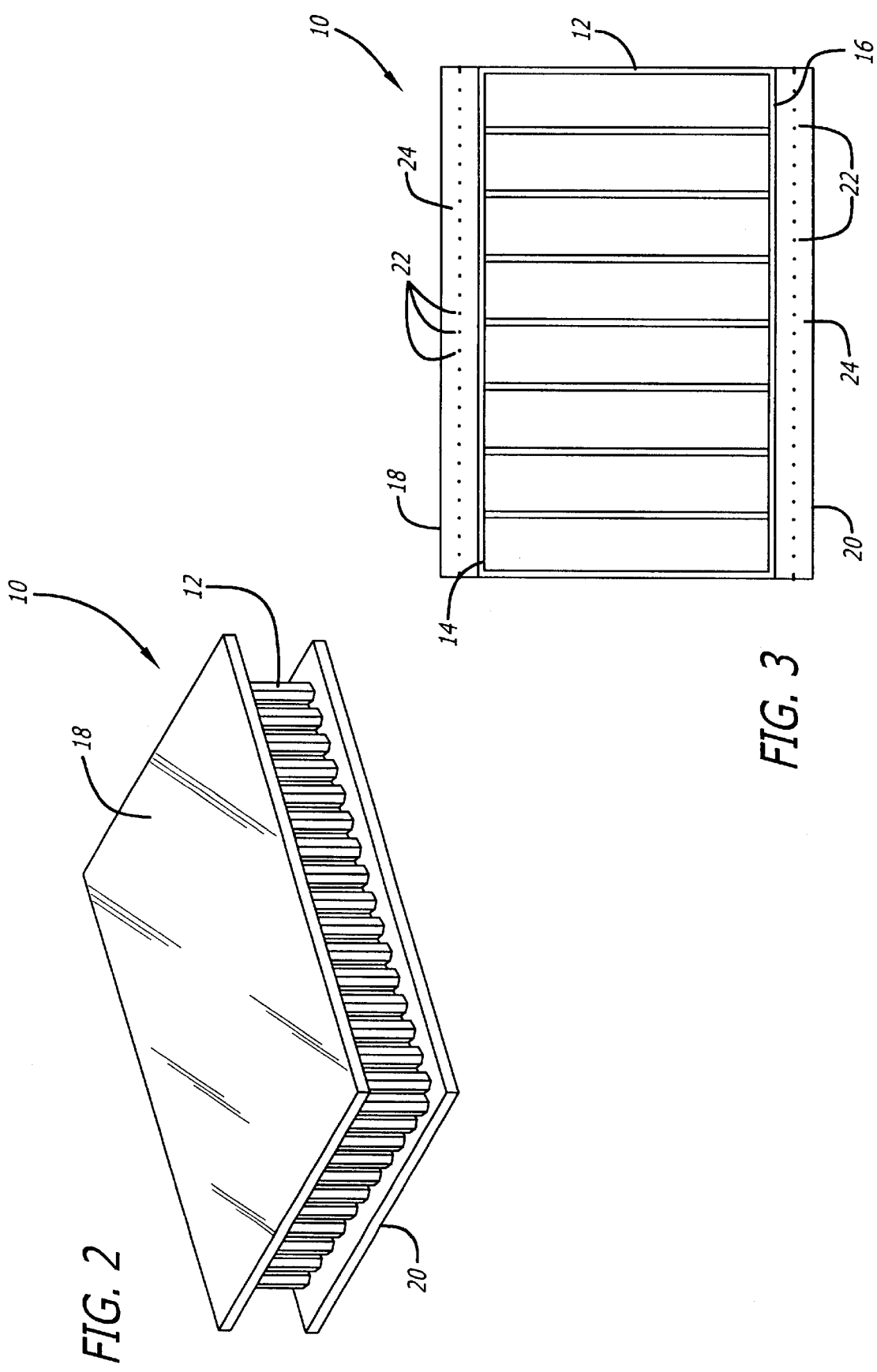

LOW SMOKE PRODUCING RESIN FOR USE IN HONEYCOMB SANDWICH PANELS

BACKGROUND OF THE INVENTION

1. Field of the Invention

The present invention relates generally to resins which are used in the fabrication of panels which include a honeycomb core sandwiched between two face sheets. More particularly, the present invention is directed to the resins which are used in making the honeycomb core and/or the face sheets.

2. Description of Related Art

Honeycomb structures are well known and widely used in many applications where a high-strength and lightweight material is required. The combined features of lightweight and strength found in honeycomb structures make them particularly well suited for use in aircraft and other applications where high strength and low weight are required. Honeycomb structures have been made from a wide variety of materials including metals, such as aluminum. Composite materials made from resin impregnated fibers and papers have also been widely used in honeycomb structures.

A popular use for honeycomb structures is in the formation of structural panels where a honeycomb is sandwiched as a core material between two face sheets. A wide variety of both metallic and non-metallic materials have been used as face sheets. Composite materials made from resin impregnated fibers have been a popular material which is used widely in the formation of face sheets.

Honeycomb sandwich panels having a core and face sheets made completely with composite materials have found wide application due to their lightweight and structural strength. However, many composite panels are not particularly resistant to heat and fire. Further, upon ignition, such panels generate smoke. Accordingly, there has been a continuing effort to develop composite sandwich panels which have good heat and flame resistance and generate reduced amounts of smoke during burning.

Phenolic resins have been widely used in fabricating both the honeycomb core and face sheets. Phenolic resins are popular because they tend to be relatively flame and heat resistant as well as being relatively low in cost. In addition, phenolic resins tend to generate lesser amounts of smoke than other resins, such as epoxies, which are commonly used in fabricating sandwich panels. Examples of existing types of temperature resistant composite panels are described in U.S. Pat. Nos. 5,309,690; 4,598,007; 4,299,872; 4,557,961; 5,798,307; 6,153,687 and EPA Publication No. 0624462A1.

SUMMARY OF THE INVENTION

In accordance with the present invention, it was discovered that the amount of smoke and heat generated by a honeycomb sandwich panel during burning can be reduced by modifying phenolic resins to reduce the hydrogen/carbon ratio of the resin. The invention is based on the discovery that a low-smoke producing modified phenolic resin can be made by reacting an aldehyde with a modified phenol composition in the presence of a catalyst for a sufficient time and at a sufficient temperature to form a resole resin which has sufficient strength to make it suitable for use in making honeycomb sandwich panels.

The modified phenol composition which is used to form the final phenolic resin is made in accordance with the present invention by substituting up to 80 weight percent of a low smoke producing compound in place of phenol. The modified phenol composition includes from 20 to 80 weight percent of phenol and from 20 to 80 weight percent of a low-smoke producing compound, such as, bisphenol-S (4,4'-dihydroxydiphenyl sulfone), biphenol or bisphenol ethers.

The modified phenol composition exhibits a reduced level of methylene linkage formation during curing of the phenolic resin. The replacement of methylene groups by sulfone groups produces a cured resole resin that generates less smoke and heat when burned and also exhibits a reduced burn rate.

The low smoke producing resin in accordance with the present invention is suitable for use as a dip resin to coat honeycomb cores. The modified resin may also be used as the matrix resin used in fabricating the face sheets and basic honeycomb core structure. The invention has wide application to situations where high-strength sandwich panels are required and where heat resistance and low-smoke generation is required.

The above-described and many other features and attendant advantages of the present invention will become better understood by reference to the following detailed description when taken in conjunction with the accompanying drawings.

BRIEF DESCRIPTION OF THE DRAWINGS

FIG. 2 shows a completed sandwich panel in accordance with the present invention wherein the two face sheets have been bonded to either side of the honeycomb.

FIG. 3 is a side view of a portion of the sandwich panel shown in FIG. 2.

DETAILED DESCRIPTION OF THE INVENTION

Figure 1:
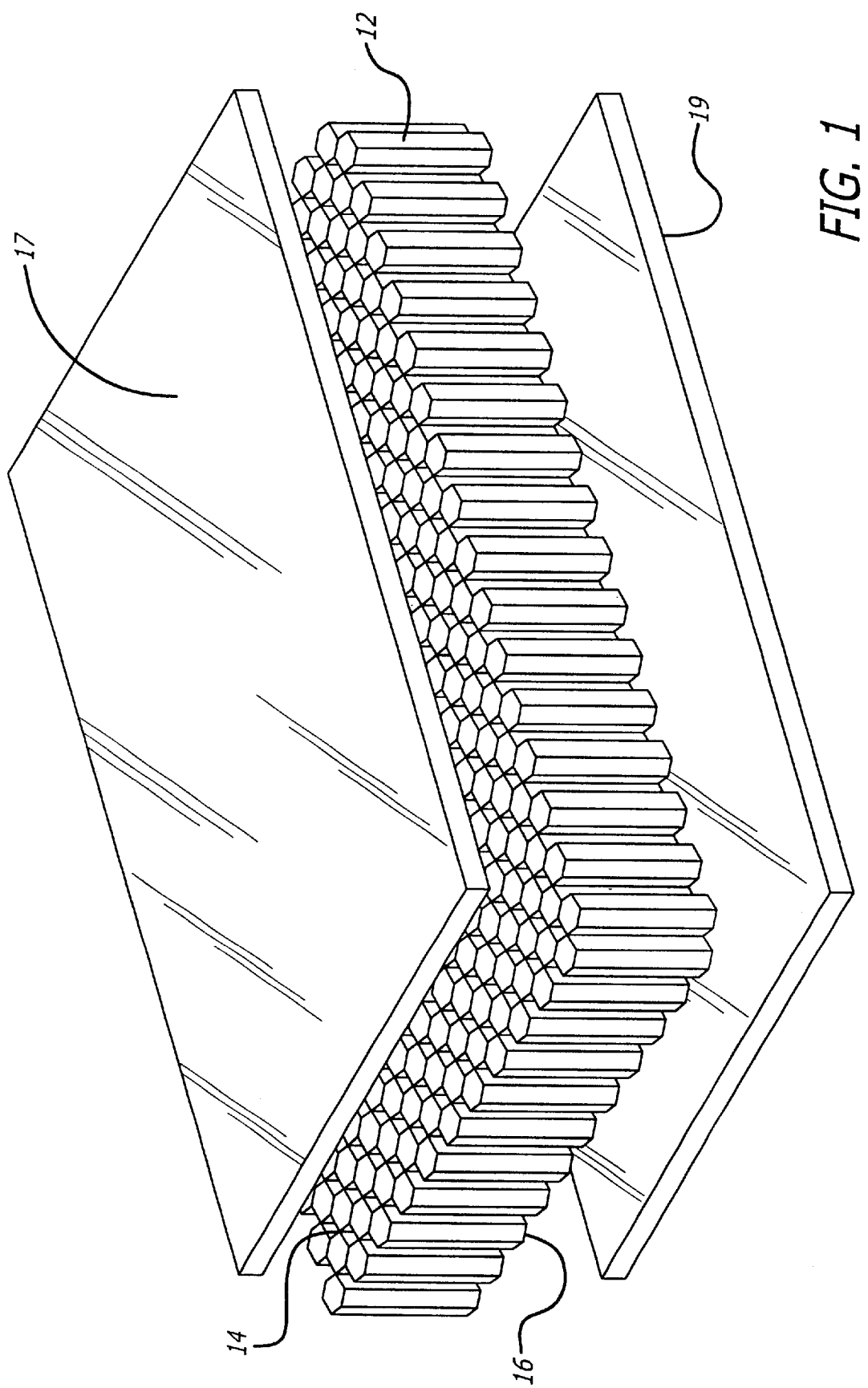
FIG. 1 is a view of a structural panel in accordance with the present invention prior to assembly. Shown in FIG. 1 is the central honeycomb and the two face sheets between which the honeycomb is sandwiched.

The modified phenolic resin in accordance with the present invention is suitable for use as a substitute for phenolic, epoxy and other resins which are typically used in fabricating sandwich panels. An exemplary sandwich panel is shown in FIGS. 2 and 3 at 10. The sandwich panel 10 includes a central honeycomb core 12 which is sandwiched between two face sheets 18 and 20. The face sheets 18 and 20 may be bonded to the core 12 using an adhesive layer or they may be attached as a prepreg which is bonded by curing to the honeycomb core. As shown in FIG. 3, each of the face sheets 18 and 20 are made up of fibers 22 which are embedded in a resin matrix 24. In FIG. 1, the face sheets are shown as prepregs 17 and 19 prior to application to the honeycomb core 12 and curing to form the final sandwich structures as shown in FIGS. 2 and 3. As is well known in the art, the face sheets may be made from a wide variety of materials other than composites.

The present invention involves modifying the phenolic resins which have been used in the fabrication of sandwich panels to reduce the amount of smoke and heat generated during burning and to reduce the burning rate. The invention has application to the resins used to impregnate the fibers used to form the honeycomb 12 as well as dip resins which are conventionally used to coat honeycomb surfaces. The invention is also useful in modifying phenolic resins used as the resin matrix in the sandwich panel face sheets 17 and 19. The modified phenolic resins may also be used in the adhesive layer for bonding the face sheets to the core.

Phenolic resin is typically made by reacting a phenol with formaldehyde in the presence of a catalyst. The reaction is carried out for a sufficient time and at a sufficient temperature to form a resole-type phenolic resin. The procedures for making phenolic resins are well known and described in numerous publications. For example, see Chapter 23 entitled "Phenolic Resins Adhesives" of the Handbook Adhesives ($2^{nd}$ Edition, 1977—Van Nostrand—Reinhold) and Chapter 5 of "Phenolic Resins Chemistry, Applications and Performance Future Direction" (Springer-Verlag, Berlin Heidelberg, New York, Tokyo, 1985). Procedures for making phenolic resins are also described in U.S. Pat. No. 5,977,253 which issued on Nov. 2, 1999. The contents of these references are hereby incorporated by reference.

In accordance with the present invention, a low-smoke producing compound is substituted in place of a portion of the phenol to produce a modified phenol composition having from 20 to 80 weight percent phenol and from 20 to 80 weight percent of the low-smoke producing compound. The modified phenol composition is used in place of conventional phenols for combination with aldehyde and an appropriate catalyst to form the final phenolic. Suitable low-smoke producing compounds include sulfone compounds such as 4,4'-bisphenol-S, 3,3'-bisphenol-S (3,3'-dihydroxydiphenyl sulfone) biphenol and biphenol ethers. 4,4'-bisphenol-S is a preferred low-smoke producing compound.

Phenols that may be used include phenol, benzophenol, alkyl phenols where the alkyl group has from 1 to 12 carbon atoms, bisphenol A and bisphenol F. Examples of suitable alkyl phenols include p-tertiary octyl phenol, nonyl phenol and dodecyl phenol. This list of phenol compounds is only exemplary. The present invention may be used to modify any other of the phenols which are used in fabrication of honeycomb sandwich panels.

Any of the conventional catalysts used in making resole type resins may be used. Suitable catalysts include the various amine and hydroxide catalysts such as sodium hydroxide, triethyl amine, ammonium lithium hydroxide, ammonium hydroxide, triethanol amine and barium hydroxide octahydrate. The molar ratio of formaldehyde to the modified phenol composition should range from about 1 to 1 to about 3 to 1. The preferred ratio is from about 1.5 to 1 to about 2.5 to 1. The amount of catalyst may be varied depending upon desired reaction conditions. However, the amount of catalyst should be between about 1 to about 20 weight percent based on the weight of the modified phenol composition. Catalyst amounts will typically be on the order of about 8 to 15 weight percent based on the weight of the modified phenol composition.

Exemplary formulations in accordance with the present invention are set forth in the following Table 1.

TABLE 1

| | Parts By Weight | | | | | | | |
|---|---|---|---|---|---|---|---|---|
| | #1 | #2 | #3 | #4 | #5 | #6 | #7 | #8 |
| 4,4'-bisphenol sulfone | 80 | 70 | 60 | 50 | 40 | 80 | 50 | 50 |
| Phenol | 20 | 30 | 40 | 50 | 60 | 20 | 50 | 50 |
| Formaldehyde, 37% in water | 78 | 84 | 91 | 97 | 104 | 66 | 97 | 97 |
| Triethylamine | 5.4 | 6 | 6.7 | 7 | 8 | 5.4 | | |
| Barium hydroxide octahydrate | | | | | | | 5 | |
| Sodium hydroxide | | | | | | | | 0.7 |

The modified phenolic composition is mixed with formaldehyde and the catalyst to form a reaction mixture which is heated to a suitable temperature (i.e. above 60 to 70 C). The formaldehyde concentration may be monitored as is conventionally known to determine the end of the reaction. Reaction times will vary depending upon the temperature and pH of the mixture. Reaction times will typically vary from a few minutes to a few hours. Modified phenol compositions preferably contain from 20 to 80 weight percent of the low-smoke producing compound. Particularly preferred modified phenol compositions include about 50 weight percent of low-smoke producing compound. Such compositions provide an optimum decrease in smoke production and heat release without unduly increasing the brittleness of the cured resin. Modified phenol compositions having more than 80 weight percent of the low-smoke producing compound are not suitable for use in honeycomb sandwich panels because they tend to be too brittle. However, it is feasible to adjust the molar ratio of formaldehyde to modified phenol to close 1 but slightly greater than 1. The cured modified phenolic resin will have lower cross-linked density when compared to a ratio of 1.5. Therefore, the cured resin will not be as brittle. With this approach, the modified phenolic resin could have 80 to 100% of bisphenol sulfone.

Upon completion of the reaction process, the resulting modified resole resin is ready for use. The modified resin may be diluted with an appropriate solvent, if necessary, for use as a dip resin as is well known in the art. The modified resin may be used directly as a matrix resin for forming face sheet prepregs. The modified resin may also be used in any other aspect of sandwich panel fabrication wherein phenol resins are typically used. For example, the modified phenol resin may be used as an adhesive for bonding face sheets to the honeycomb core.

Examples of practice are as follows:

EXAMPLE 1

Honeycomb made from cellulose paper impregnated with phenolic resin was provided. The cell size of the honeycomb core was ⅛ inch with the cellulose portion of the core weighing two pounds per cubic foot and the phenolic matrix weighing one pound per cubic foot. The honeycomb was coated with a conventional phenolic dip resin to produce a core weighing 4.6 pounds per cubic foot. Another honeycomb was dipped in a modified phenolic resin made using the same phenolic dip resin except that the ratio of bisphenol sulfone to phenol was about 1 to 1. The resulting core also weighed 4.6 pounds per cubic foot. Both cores were trimmed to 0.5 inch thickness. A burn test was performed in which both cores were burned under the same conditions. The core which was coated with the resin in accordance with the present invention generated less smoke and had a lower burn rate.

EXAMPLE 2

Honeycomb was made from cellulose paper impregnated with phenolic resin in the same manner as Example 1. The cell size was ⅛ inch with total weight of the impregnated honeycomb being 2 pounds per cubic foot. The honeycomb was coated with a conventional phenolic dip resin to produce a core weighing 3 pounds per cubic foot. The core was trimmed to be 0.5 inches thick and then sandwiched between two face sheets made from two-ply glass fibers impregnated with a phenolic resin to form a sandwich panel. A second sandwich panel was made in the same manner as just described except that the phenolic dip resin had a ratio of bisphenol sulfone to phenol which was about 1 to 1 in accordance with the present invention. Burn tests performed on the sandwich panels showed that the panel having the core coated with resin according to the present invention generated less smoke and had a lower burn rate.

EXAMPLE 3

Any one of the formulations set forth in Table 1 may be used as the matrix resin for impregnating fibers used to form the face sheets used in construction of a sandwich panel (see FIG. 1 at 17 and 19). The face sheets made using the modified phenolic composition will generate less smoke and heat when burned than face sheets using conventional phenolic resins.

EXAMPLE 4

Any one of the formulations set forth in Table 1 may be used as the matrix resin for the honeycomb. For example, the cellulose-based honeycomb set forth in Example 1 may include one pound per cubic foot of the low-smoke producing phenolic resin in accordance with the present invention which is used in place of the conventional phenolic resin matrix

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the above preferred embodiments and examples, but is only limited by the following claims.

What is claimed is:

1. A resin for use in making honeycomb sandwich panels that are located in situations where low smoke generation is required during burning, said resin being made by reacting formaldehyde with a modified phenol composition in the presence of a catalyst for a sufficient time and at a sufficient temperature to form a resole resin which is suitable for use in making said honeycomb sandwich panels, said modified phenol composition comprising from 20 to 80 weight percent of a phenol and from 20 to 80 weight percent of a low smoke producing compound selected from the group consisting of 4,4'-dihydroxydiphenyl sulfone, 3-3'-dihydroxydiphenyl sulfone, biphenol, and bisphenol ethers.

2. A resin for use in making honeycomb sandwich panels according to claim 1 wherein said low smoke producing compound is 4,4'-dihydroxydiphenyl sulfone.

3. A resin for use in making honeycomb sandwich panels according to claim 2 wherein the weight percent of 4,4'-dihydroxydiphenyl sulfone is from 40 to 60 weight percent.

4. A honeycomb located in a situation where low smoke generation during burning is required comprising a cellular structure which comprises walls that are coated with a dip resin made according to claim 1.

5. A face sheet for use in making a honeycomb sandwich panel that is located in a situation where low smoke generation during burning is required, said face sheet comprising at least one fiber layer embedded in a matrix resin wherein said matrix resin is made according to claim 1.

6. A honeycomb sandwich panel comprising honeycomb according to claim 4 and at least one face sheet attached to said honeycomb.

7. A honeycomb sandwich panel comprising a honeycomb and at least one face sheet according to claim 5.

8. In a resin for use in making honeycomb sandwich panels that are located in situations where low smoke generation during burning is required, said resin being made by reacting formaldehyde with a phenol in the presence of a catalyst for a sufficient time and at a sufficient temperature to form a resole resin which is suitable for use in making said honeycomb sandwich panel, wherein the improvement comprises reducing the amount of smoke and heat generated during burning of said resin by replacing said phenol with a sufficient amount of a low smoke producing sulfone compound to reduce the amount of smoke generated by said resin during burning thereof.

9. An improved resin according to claim 8 wherein said low smoke producing compound is selected from the group consisting of 4,4'-dihydroxydiphenyl sulfone, 3,3'-dihydroxydiphenyl sulfone, biphenol and bisphenol ethers.

10. An improved resin according to claim 8 wherein a sufficient amount of said phenol is replaced to provide a composition comprising from 20 to 80 weight percent phenol and from 20 to 80 weight percent of said low smoke producing compound.

11. A method for making a resin for use in making a honeycomb sandwich panel that is located in situations where low smoke generation during burning is required, said method comprising the step of reacting formaldehyde with a modified phenol composition in the presence of a catalyst for a sufficient time and at a sufficient temperature to form said resin which is suitable for use in making said honeycomb sandwich panels, said modified phenol composition comprising from 20 to 80 weight percent of a phenol and from 20 to 80 weight percent of a low smoke producing compound selected from the group consisting of 4,4'-dihydroxydiphenyl sulfone, 3,3'-dihydroxydiphenyl sulfone, biphenol and bisphenol ethers.

12. A method for making a resin according to claim 11 wherein said low smoke producing compound is 4,4'-dihydroxydiphenyl sulfone.

13. A method for making a resin according to claim 12 wherein the weight percent of 4,4'-dihydroxydiphenyl sulfone is from 40 to 60 weight percent.

14. In a method for making a resin for use in honeycomb sandwich panels that are located in situations where low smoke generation during burning is required, said resin being made by the step of reacting formaldehyde with a phenol in the presence of a catalyst for a sufficient time and at a sufficient temperature to form a resole resin which is suitable for use in making said honeycomb sandwich panel, wherein the improvement comprises reducing the amount of smoke and heat generated during burning of said resin by replacing said phenol with a sufficient amount of a low smoke producing sulfone compound to reduce the amount of smoke generated by said resin during burning thereof.

15. An improved method according to claim 14 wherein said low smoke producing compound is selected from the group consisting of 4,4'-dihydroxydiphenyl sulfone, 3,3'-dihydroxydiphenyl sulfone, biphenol and bisphenol ethers.

16. An improved method according to claim 14 wherein a sufficient amount of said phenol is replaced to provide a composition comprising from 20 to 80 weight percent phenol and from 20 to 80 weight percent of said low smoke producing compound.

17. A method for making a honeycomb that is located in a situation where low smoke generation during burning is required, said method comprising the step of applying a resin according to claim 1 to said honeycomb to provide a coating thereon.

* * * * *